United States Patent [19]
Musmanno et al.

[11] Patent Number: 5,826,243
[45] Date of Patent: Oct. 20, 1998

[54] INTEGRATED SYSTEM FOR CONTROLLING MASTER ACCOUNT AND NESTED SUBACCOUNT(S)

[75] Inventors: Thomas Musmanno, Warren; Kelly Ur, East Brunswick, both of N.J.

[73] Assignee: Merrill Lynch & Co., Inc., New York, N.Y.

[21] Appl. No.: 176,207

[22] Filed: Jan. 3, 1994

[51] Int. Cl.[6] .................................................. G06F 12/60
[52] U.S. Cl. ............................................ 705/35; 705/39
[58] Field of Search .......................... 364/408; 235/379; 705/35, 39

[56] References Cited

PUBLICATIONS

Martin F. Stankard, "Profiting from the White Collar Service Boom," National Underwriter, v90, n31, pp. 13, 17, abstract, Aug. 2, 1986.
Mitchell S. Farkas, "The Account That Transformed a Brokerage into a Bank," Financial & Accounting Systems, v6, n4, pp. 8 –12, abstract, Wintr, 1991.
Bank on Windows with Money and Quicken Computer Shopper, Feb. 1992.
Financial Managers: Keeping Track of Your Personal Accounts PC Magazine, Dec. 27, 1988.
The King of Finance Software Gets a Brand–New Face, PC–Computing, Dec. 1990.
Checkfree: The Good, The Bad and The Zealots, Home Office Computing, Sep. 1992.
Technology Shatters "Bankers Hours", Arend, Mark, ABA Banking Journal, v85,n5 , p57(4), May 1993.
"Ways to Get the Most from Your Bank", Hedberg, Augustin, Money, Mar. 1988.
Field Communications Department, Merrill Lynch; *Introducing . . . The CMA Master Financial Service*; Dec. 8, 1992; pp. 1–6.

*Primary Examiner*—Gail O. Hayes
*Assistant Examiner*—William N. Hughet
*Attorney, Agent, or Firm*—Hopgood, Calimafde, Kalil & Judlowe

[57] ABSTRACT

Data processing for an improved securities brokerage/cash management system which supervises, implements and coordinates a composite account having a master account and one or more subaccount(s). The nested subaccounts incorporate a subset of features corresponding to the specific needs dictated by the purpose of the subaccount and thus streamline system operation for the recordkeeper.

8 Claims, 4 Drawing Sheets

INTEGRATED SYSTEM FOR CONTROLLING MASTER ACCOUNT AND NESTED SUBACCOUNT(S)

The present invention generally relates to computer managed financial business systems. More specifically the invention provides data processing methods and apparatus for directing an account management system which incorporates master accounts with a plurality of nested subaccounts having a specific subset of individual properties.

BACKGROUND OF THE INVENTION

The financial world has been enhanced by the ability to use computers to manage assets. Financial institutions extensively employ elaborate computer systems to direct and process the numerous accounts retained on behalf of the customers. These accounts routinely track individual assets for the account holder and permit timely updating thereof pursuant to transactions made by the account holders in accordance with the account restrictions. These systems are directed to accounts such as brokerage accounts wherein securities may be bought and sold with a minimal amount of paper work as the transactions and recordations thereof is fully automated within the computer.

More recently, systems have been developed that permit the integration of disparate types of accounts for a single account holder thus expanding substantially the account holders ability to control his/her assets. This is exemplified by the CMA® accounts which incorporate traditional check writing and credit/debit card features with brokerage and mutual fund accounts for a single user—integrated in a seamless fashion from the user's vantage.

The above-noted integrated account systems are best exemplified from a processing standpoint by the specific patents directed to their implementation. More particularly, U.S. Pat. Nos. 4,346,442, 4,376,978, 4,597,046 and 4,774,663 are directed to such integrated account processing by one or more digital computers and are herein incorporated by reference as if restated in full. Generally, the above-identified patents disclose a computer system for directing a plurality of securities brokerage/cash management accounts. That system, inter alia, supervises, implements and coordinates a margin securities brokerage account, and permits participation in one or more short term investments (e.g., money market or comparable funds).

In recent times, there has been an increasing desire by individual account holders to segment account functions into separately managed areas of financial interest. For example, account holders often desire the ability to provide separate account functions to other members of their families, or to separate specific expenses on an account basis, e.g., mortgage payments, etc. In the past, this has been accomplished by simply opening new accounts, fully featured, directed to the specific family member and/or specific expense. By pursuing this tack, the account holder develops multiple disparate accounts—often functionally equivalent, but without intercommunication therebetween. The fallout of this is excessive expenditures in maintaining multiple accounts that lack any coordination and thus become difficult to manage by the individual.

Moreover, a financial management institution such as a brokerage house handles accounts for thousands of people, usually with each person having two or more separate accounts (i.e., a checking account, a money market account for long-term goals and a savings account). The lack of integration between multiple accounts held by the same individual or individuals within the same household introduces, from the brokerage house perspective an additional level of recordkeeping requirements and thus a corresponding increase in fees to the account holder.

It was within the framework of the above understanding that the present invention was developed.

OBJECTS AND SUMMARY OF THE PRESENT INVENTION

It is an object of the present invention to provide an improved brokerage/cash management system.

It is another object of the present invention to enable individuals to easily and cost effectively manage their assets and have a concise, clear understanding of the value of their assets.

It is a further object of the present invention to enable an individual to delineate short and long term assets into a composite account with a single master account and a number of subaccounts which are linked within the composite account.

It is another feature of the present invention to allow individuals in the same household or family to create a single composite account for all their funds.

The above and other objects of the present invention are realized in a data processing system that directs and manages a plurality of brokerage/cash management accounts. The present system provides an account which includes at least one master account having one or more functional capabilities such as check writing, credit/debit card management, access to brokerage services, etc. The master accounts are linked to one or more nested subaccounts which are separately directed to a subset of features falling within the master account, said features corresponding to the specific needs associated with the purpose of that subaccount. Recordkeeping between the master and its associated subaccounts is done on an integrated basis as each subaccount is specifically linked and controlled by the parameters associated with its master.

In accordance with the varying aspects of the present invention, the foregoing subaccounts exclude specific credit/debit features to insure proper utilization for their intended functions, e.g., college savings, mortgage payment. By specifically tailoring the subaccount functional profile to the delineated needs of that account, the system operator can effectively streamline recordkeeping operations and thus reduce overall costs.

The foregoing and additional features and advantages of the instant invention will become more readily apparent from the following detailed description of a specific illustrative embodiment thereof, presented hereinbelow in conjunction with the accompanying drawings in which:

DETAILED DESCRIPTION OF THE PRESENT INVENTION

First, briefly, the present invention is directed to a data processing system for managing a plurality of composite accounts for financial cash management, wherein each composite account has a master account and at least one subaccount that allows an individual to establish and manage their (and their household's) complete portfolio of cash assets with one concise, cost effective account. For an individual, this system, described more fully below, has a single master account, with a variety of subaccounts directed to a specific goal such as monthly household expenses, long term investment strategies and other financial goals. The database management system has a central processing unit ("CPU") for information such as name, address and account information for each individual, with a data processing system, known as the Link System to recognize that an account (either a master account or a subaccount) is part of the composite account for the individual, a data processing means for receiving an individual's request on either a real time or periodic basis for the transfer of funds between the linked accounts and means for generating, displaying and outputting reports.

Figure 1:
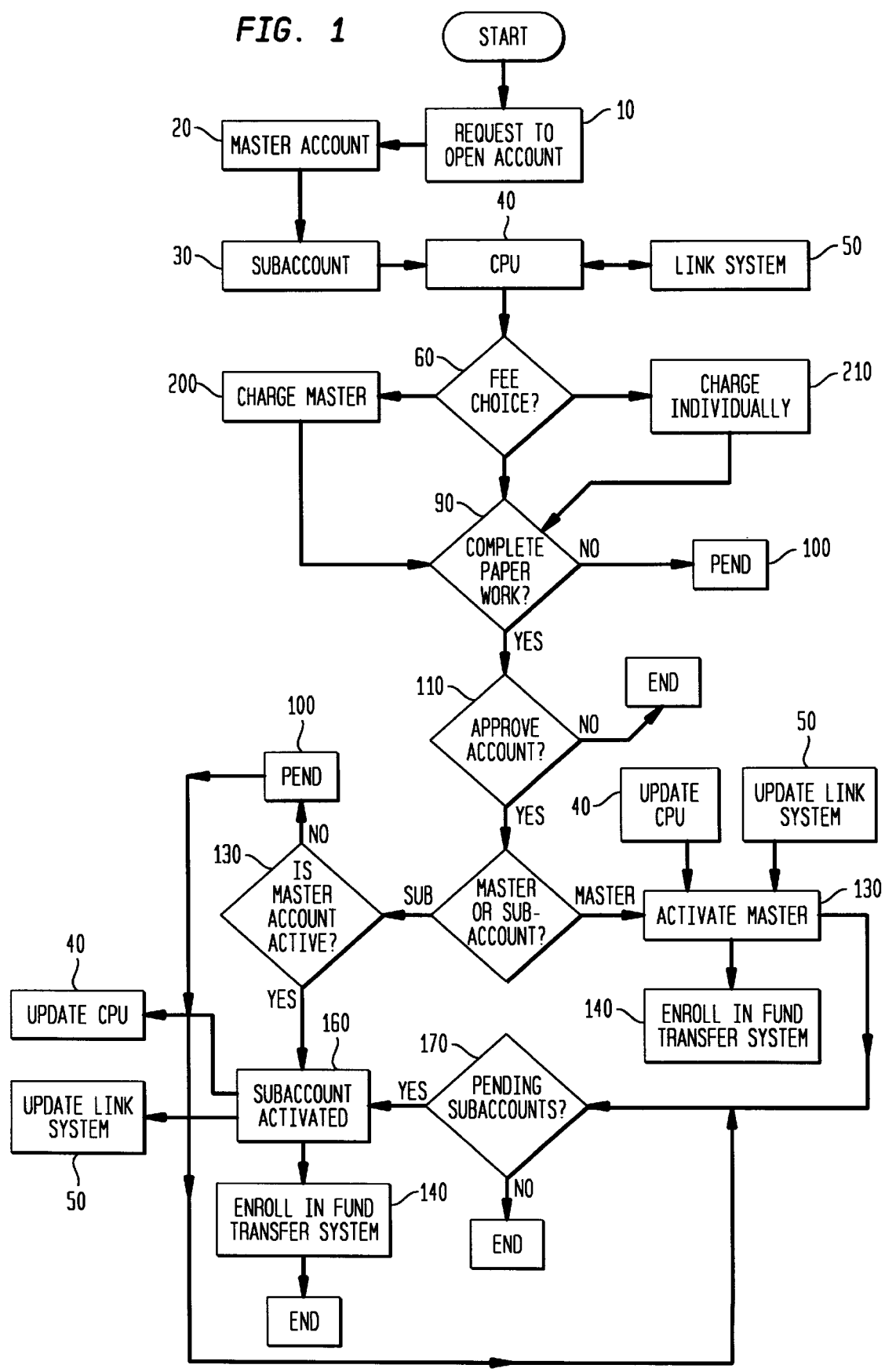
FIG. 1 is a flow chart for the establishment of the composite account with a master and subaccounts in the improved brokerage/cash management linked system.

Referring now to FIG. 1 there is an operational flow chart showing the data processing system for establishment of a brokerage/cash management system in accordance with the invention.

Figure 2:
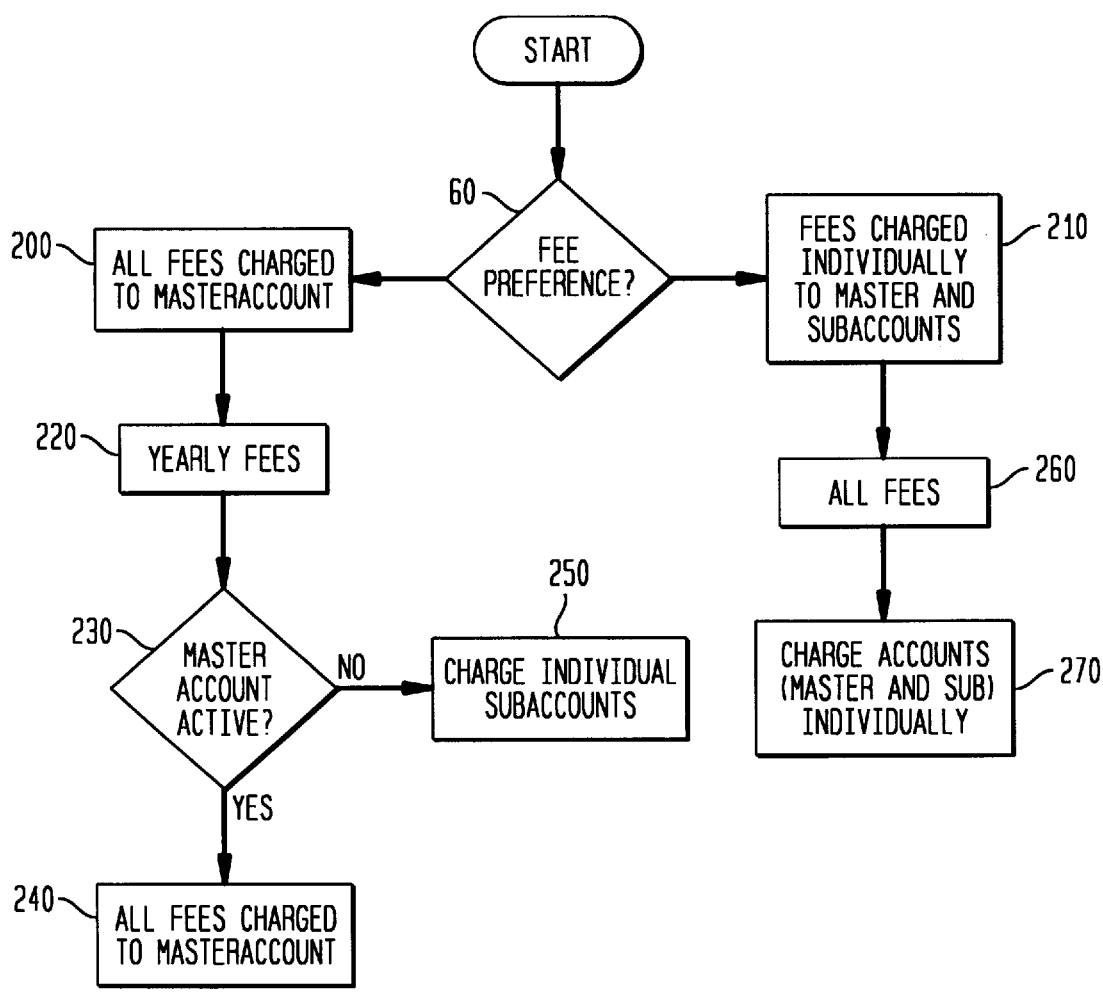
FIG. 2 is a flow chart depicting the establishment of the fee charges for the linked accounts.

Beginning at the top of the FIG. 1, a request is inputted and received to open an account 10. The Master Account 20 and one or more Subaccounts 30 are opened and a Central Processing Unit ("CPU") 40 containing the master database will receive the individual's identification such as the name and address of the individual, along with the information for that account such as the master account identification number, the subaccount identification number and the account asset information. This information will also be transmitted to the data processing unit which will link the accounts (the "Link System") 50. The system will then request that a Fee Preference 60 be selected by the individual for the Master Account 20 and for each of the Subaccount(s) 30 opened. The Fee Preference 60 is illustrated in FIG. 2, discussed below allows fees to be charged either completely to the Master Account 200 or individually to the Master Account and Subaccounts 210.

At this point, the paperwork for the account is reviewed for completeness 90. If the paperwork is not completed, the request will be Pended 100 for a set period of time (e.g. 90 days), after which time if the completed paperwork has not been received, the request will lapse. Once the paperwork is completed, then the request will be reviewed for Approval 110 for the Master Account 20 and the Subaccount(s) 30. If it is not approved the request is denied (End). If the account is approved, then the Master Account 20 is Activated 130 and it is automatically Enrolled in the Fund Transfer System 140. At this time, the CPU 40 containing the master database and the Link System 50 are automatically updated with the information that the Master Account 20 has been activated. The Fund Transfer System 140 will allow the Master Account 20 to transfer funds both internal and external to the system, including transfers to and from any linked subaccount(s).

At this point, the determination will be made, whether any Subaccount(s) 30 are Pending 170 with respect to the newly activated Master Account 20. If the determination is made that Subaccount(s) 30 are Pending 170, then the Subaccount(s) 30 are Activated 160 and Enrolled in the Fund Transfer System 140. For the Subaccounts 30, the Fund Transfer System 140 will allow funds to be transferred internally within the composite account to the linked Master Account 20 or another linked Subaccount 30.

At a time after the Master Account 20 is activated, an individual may wish to open other subaccount(s). Each time a request is made to open a Subaccount 30, the CPU 40 and the Link System 50 will receive all individual identification such as the name, address and all account information for the Master Account 20 and for all existing linked subaccounts 30 for the individual. The system will then request that a Fee Preference 60 be selected for the new Subaccount. See discussion of FIG. 2 below.

At this point, the paperwork for the Subaccount is reviewed for completeness 90. If the paperwork is not completed, the request will be Pended 100 for a set period of time (e.g. 90 days), after which time if the completed paperwork has not been received, the request will lapse. Once the paperwork is completed, then the request will be reviewed for approval 110 for the Subaccount 30. If it is not approved the request is denied (End). If the account is approved, then a determination will be made as to whether an Activated Master Account 130 has been linked to the new Subaccount 30. If an Activated Master Account 130 is present then, the new Subaccount is activated 160 and Enrolled in the Fund Transfer System 140. For the Subaccounts 30, the Fund Transfer System 140 will allow funds to be transferred internally within the composite account to the linked Master Account 20 or another linked Subaccount 30. At this time, the CPU 40 containing the master database and the Link System 50 are automatically updated with the information that the new Subaccount(s) 30 have been activated. If an activated Master Account 130 is not present, then the request will be Pended 100 for a set period of time (e.g. 90 days), after which time, the account will be upgraded to a Master Account 20.

If the subaccount is for another household member, the CPU 40 containing the master database and the Link System 50 will be updated to reflect this information.

Now referring to FIG. 2, once an account has been requested, the Fee Preference 60 for that account must be established. After the account has been requested, the individual will be asked to allot fee charges for the Master Account 20 and all Subaccount(s) 30 either entirely to the Master Account 200 or alternatively individually to the Master Account and each of the established Subaccount(s) 210. Since the Subaccounts 30 have limited features with respect to a Master Account, fees applied to the Subaccount(s) will generally be noticeably less.

If the individual chooses to have All Fees charged to a Master Account 200, then all initial fees for Master Account 20 and subsequently for all Subaccount(s) 30 will be charged against the Master Account 200. Then when it is time for the Yearly Fees 220 for the Master Account and all Subaccounts, the system will check to see if the Master Account is Active 230. If the Master Account is Active 230, then all charges for the Master Account and all Subaccounts will be charged against the Master Account 240. However, if the Master Account is not active, then the individual Subaccounts 250 will be charged on their respective anniversaries.

If the individual chooses to have All Fees charged against a Master Account and Subaccount(s) individually 210, then All Fees 260 will be charged against each individual account on its respective anniversary 270.

Cost savings will normally be shown if the individual chooses to have All Fees charged against a master account 200 since charges will not accrue on any subaccount until the next anniversary of the master account.

For example, if a master account with an annual fee of $100.00 is opened in April 1992 (with its yearly fees charged at that time), then a linked subaccount with an annual fee of $25.00 is opened in May 1992 and the individual chooses to have all fees charged against the master account, no fees will be charged for the subaccount until April 1993, at which time the master account will be charged $125.00. However, if when the subaccount is opened, the individual chooses to have the subaccount fees charged against the subaccount, then in May 1992, $25.00 will be charged and another $25.00 will be charged in May 1993. By May 1993, if the individual chose to have all fees charged against the master account, the total fees incurred would have been a total of $225.00. If the individual chose to have fees charged individually, then by May 1993 the total fees incurred would have been a total of $250.00.

The above example also illustrates the cost effectiveness of the invention, generally. In the above example, if the composite account was not available, then the individual would have had to establish two separate primary accounts, each having an annual fee of $100.00. Therefore, in April 1992, the individual would have been charged $200.00 and then again in April 1993 the individual would have been charged $200.00 for a total of $400.00 as opposed to the $225.00 or $250.00 in fees incurred in the new system.

As discussed in FIGS. 1 and 2 above, the securities brokerage/cash management system which supervises, implements and coordinates a margin securities brokerage account is constructed of a Master Account and one or more subaccount(s) each having a fee preference option. Once the Master Account and the subaccount(s) are activated, linked and enrolled in the Fund Transfer System each can transfer funds between such linked accounts on a periodic basis, e.g., a weekly basis, and/or on a demand (as needed) basis by the individual. In addition to transferring funds, deposits can be directly made to the Master or any of the Subaccount(s).

Figure 3:
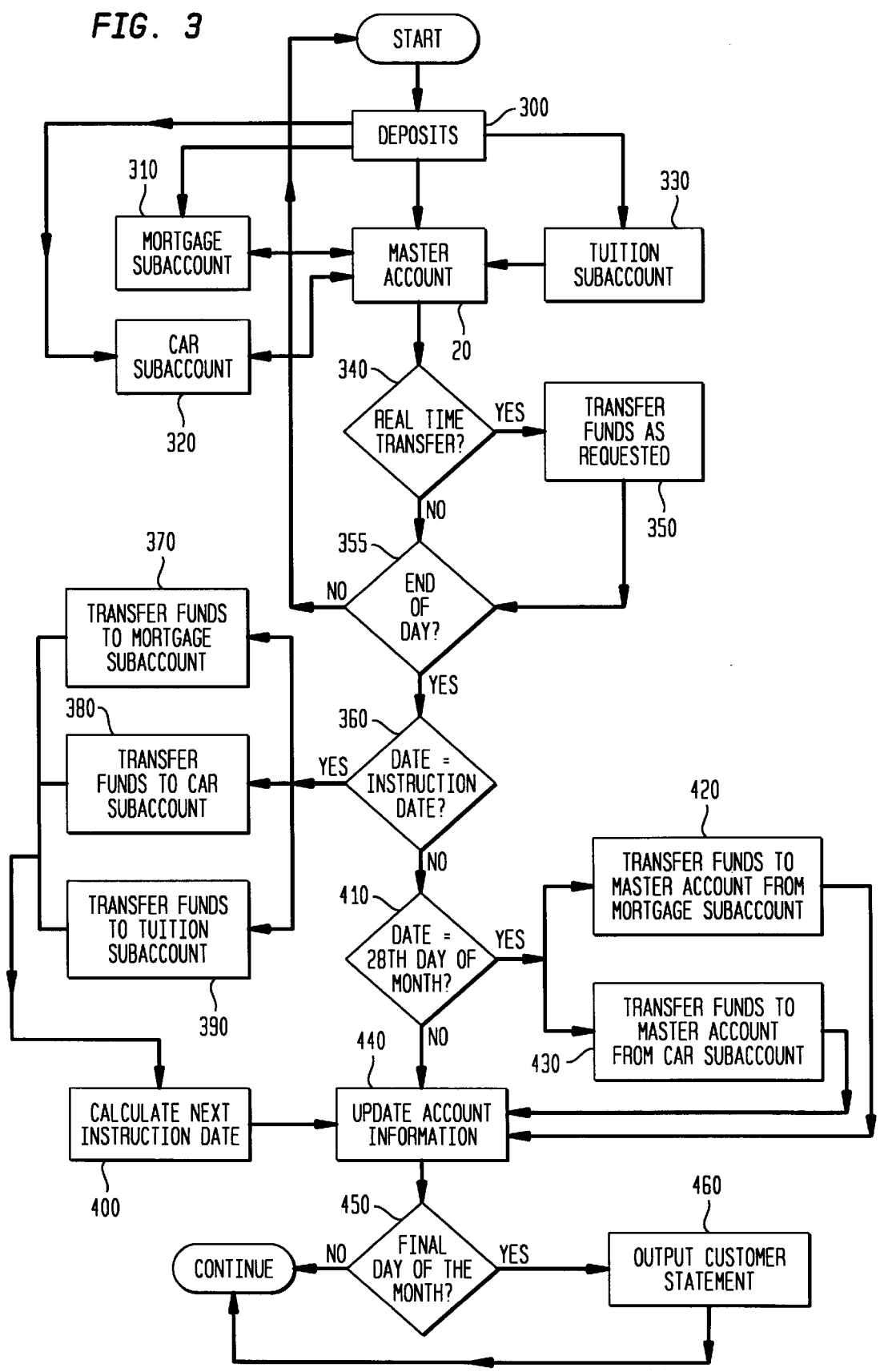
FIG. 3 is the flow chart for a representative account.

FIG. 3 is an illustrative example of an improved securities brokerage/cash management system which supervises, implements and coordinates a margin securities brokerage account having a Master Account 20 and three subaccounts denoted respectively as Mortgage Subaccount 310, Car Subaccount 320 and Tuition Subaccount 330.

Starting with the Deposit 300, deposits to the composite account can be made to the Master Account 20 or directly to the Mortgage Subaccount 310, Tuition Subaccount 330 or Car Subaccount 320. Next, on a continuing basis, the system will check to see if there are any real time transfers 340 (i.e. customers manual request for a transfer) pending and if there are, the transfer will be processed at the time of the request 350. The system will transfer the requested funds from the specified account (e.g., the Tuition Subaccount 330) to the destination account(s) (e.g., the Master Account 20).

At the End of the Day 355, the day's periodic transactions will be processed, including the transfers between the linked Master Account, Mortgage, Car and Tuition subaccounts.

In this example, the accounts have been set up to have an automatic transfer of funds from the Master Account 20 to the Mortgage Subaccount 310, the Car Subaccount 320 and the Tuition Subaccount 330 every 14 days and an automatic transfer of funds to the Master Account 20 from the Mortgage Subaccount 310 and the Car Subaccount 320 on the 28th day of each month.

At the End of the Day 355, the system will check to see if today's Date is the date of next periodic instruction 360. If it is, then the system will transfer a predetermined amount of funds to each the Mortgage Subaccount 370; the Car Subaccount 380; and the Tuition Subaccount 390. The system will then calculate and set the date of the next periodic instruction 400. Next the system will determine whether the date is the 28th day of the month 410. If the Date is the 28th day of the month 410, then it will transfer a predetermined amount of funds to the Master Account from the Mortgage Subaccount 420 and from the Car Subaccount 430. In this example, an individual does not have the subset ability to write checks directly from the subaccounts, therefore the individual can periodically transfer money to the Master Account for payments.

After the system has completed each transfer described above, it will appropriately update the Account Information 440 for the Composite Master Account 20 and Linked Subaccounts 30. If it is the Final Day of the month 450, the system will generate a concise customer statement 460 on the month's activities for the composite account including the Master Account 20 and each of the linked Subaccounts 30 for each individual.

Figure 4:
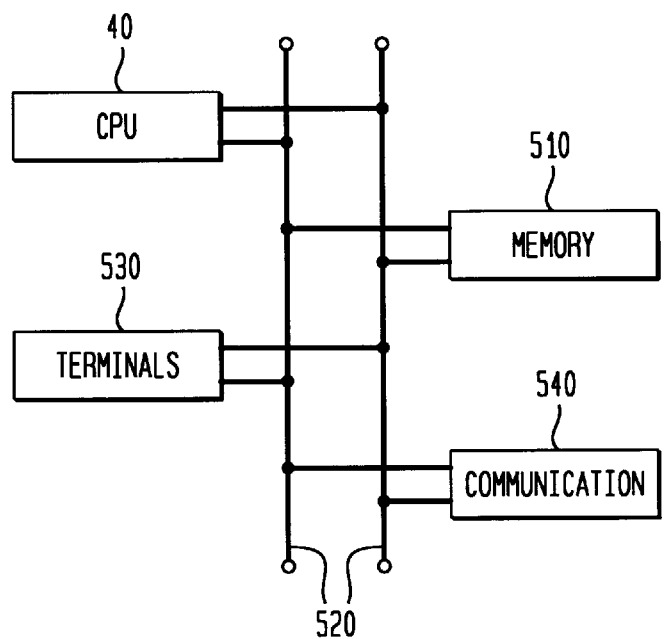
FIG. 4 depicts the operative elements in block diagram form for the present invention.

Attention is now directed to FIG. 4 wherein hardware elements of the present invention are provided. In this context, the selected hardware platform is not particularly limitative and will be dictated by the number and activity of accounts under management. In particular, the Central Processing Unit ("CPU") 40 containing the system database and which implements the system commands is connected to memory unit 510 via address and data buses 520 for update and access to system records such as account assets. Additionally, support exists for terminal control 530 to allow multiple access and input to data and output to data, along with communication management 540 for communication exchange with the systems shown in FIG. 1.

The above-described composite account arrangement has thus been shown to provide an improved securities brokerage/cash management system which supervises and integrates a brokerage account in which a Master Account with one or more linked subaccounts is used to manage an individual's funds which accounts (master and subaccounts) can transfer funds to and from, providing greater flexibility for the individual, while providing earned income for funds not invested or required to satisfy expenditures.

It should be noted that the above descriptions are presented to illustrate the invention and that modifications by those skilled in the art are possible without departing from the spirit and scope of the invention.

What is claimed is:

1. A data processing system for managing a plurality of accounts, wherein each account includes a master account, is held by a first individual, and is directed to particular profile of financial attributes and capabilities, comprising:

account input means for receiving account transactions from said individual corresponding to account activity inquiries and account asset transfers in a master account;

account processing means for creating and controlling one or more subaccounts associated with said master account, wherein said account processor permits a particular profile of account transactions to be associated with each said subaccount, said profile representing a subset of transaction functions or identifications associated with said master account; and account reporting means for creating, displaying, or outputting reports corresponding to transactions undertaken for each account on a periodic basis.

2. The system of claim 1, wherein said accounts processing means includes means for transferring assets between said master account and each of said subaccounts.

3. The data processing system of claim 2, wherein said account processing means provides an identification that a particular subaccount is associated with a second individual and with a master account held by said first individual, and further provides an identification that said first and second individuals are members of the same household.

4. The system of claim 1 wherein said master account includes asset transaction means for support of at least one credit card, one checking account and one security brokerage account.

5. The system of claim 4 wherein said subaccounts include transaction capabilities specifically limited to asset transfer between said subaccount and said master account.

6. The data processing system of claim 5, wherein said account processing means provides an identification that a particular subaccount is associated with a second individual and with a master account held by said first individual, and further provides an identification that said first and second individuals are members of the same household.

7. The data processing system of claim 4, wherein said account processing means provides an identification that a particular subaccount is associated with a second individual and with a master account held by said first individual, and further provides an identification that said first and second individuals are members of the same household.

8. The data processing system of claim 1, wherein said account processing means provides an identification that a particular subaccount is associated with a second individual and with a master account held by said first individual, and further provides an identification that said first and second individuals are members of the same household.

* * * * *